United States Patent [19]

Tzikas

[11] 4,243,600

[45] Jan. 6, 1981

[54] PROCESS FOR THE MANUFACTURE OF 1,4-DIAMINOANTHRAQUINONE-2-CARBOXYLIC ACID

[75] Inventor: Athanassios Tzikas, Pratteln, Switzerland

[73] Assignee: Ciba-Geigy AG, Basel, Switzerland

[21] Appl. No.: 33,405

[22] Filed: Apr. 26, 1979

[30] Foreign Application Priority Data

Apr. 28, 1978 [CH] Switzerland ............... 4649/78

[51] Int. Cl.³ ........................... C07C 103/75
[52] U.S. Cl. ................................. 260/377
[58] Field of Search ................. 260/376, 377, 378

[56] References Cited

U.S. PATENT DOCUMENTS

| | | | |
|---|---|---|---|
| 2,051,004 | 8/1936 | Koeberle et al. | 260/378 |
| 2,717,255 | 9/1955 | Westlake et al. | 260/377 |
| 3,417,090 | 12/1968 | Pelster et al. | 260/378 |
| 4,016,182 | 4/1977 | Buecheler | 260/377 |
| 4,046,785 | 9/1977 | Hirai et al. | 260/377 |
| 4,076,735 | 2/1978 | Seha | 260/378 |

*Primary Examiner*—Winston A. Douglas
*Assistant Examiner*—Raymond K. Covington
*Attorney, Agent, or Firm*—Wenderoth, Lind & Ponack

[57] ABSTRACT

A process for the manufacture of 1,4-diaminoanthraquinone-2-carboxylic acid, which comprises reacting 1-nitroanthraquinone-2-carboxylic acid or derivatives thereof with hydroxylamine or derivatives thereof, in alcohol/water mixtures at basic value pH values.

7 Claims, No Drawings

PROCESS FOR THE MANUFACTURE OF 1,4-DIAMINOANTHRAQUINONE-2-CARBOXYLIC ACID

The present invention provides a process for the manufacture of 1,4-diaminoanthraquinone-2-carboxylic acid, which comprises reacting 1-nitroanthraquinone-2-carboxylic acid or derivatives thereof with hydroxylamine or derivatives thereof, in alcohol/water mixtures at basic pH values.

The following compounds may be cited as exemplifying starting compounds of the present invention:
1-nitroanthraquinone-2-carboxylic acid and derivatives thereof, in particular carboxylates and carboxamides, for example ethyl 1-nitroanthraquinone-2-carboxylate, 1-nitro-2-carbamoylanthraquinone, 1-nitro-2-N-methylcarbamoylanthraquinone, 1-nitro-2-N-ethylcarbamoylanthraquinone, 1-nitro-2-N,N-dimethylcarbamoylanthraquinone, 1-nitro-2-N,N-diethylcarbamoylanthraquinone.

Examples of hydroxylamine and derivatives thereof are: hydroxylamine hydrochloride, hydroxylammonium sulfate, hydroxylamine-sulfonic acid. Hydroxylamide hydrochloride is preferred.

The reaction of the present invention is carried out in alcohol/water mixtures. Examples of suitable alcohols are: methanol, ethanol, propanol, isopropanol, n-butanol, isobutanol, benzyl alcohol. The ratio of alcohol to water can vary. The reaction is preferably carried out with an excess of water, in particular in mixtures of methanol and water or ethanol and water.

The reaction is carried out in a basic medium, preferably in a strongly basic medium, for example at a pH value of at least 10. The pH value is adjusted preferably by addition of an alkali metal hydroxide, in particular sodium hydroxide or potassium hydroxide.

The reaction temperature can vary in any range compatible with the reactants, preferably in the range between room temperature and the boiling temperature of the reaction mixture. It is particularly advantageous to begin the reaction at room temperature and to bring it to completion by raising the temperature to near that of the boiling range. An advantageous temperature range for the reaction is that from about 0° C. to 100° C. The reaction products can be isolated from the reaction mixture in a manner known per se. They are valuable intermediates for the manufacture of vat dyes, pigments and disperse dyes.

The invention is illustrated by the following Examples, in which the parts and percentages are by weight unless otherwise stated. The relationship of parts by weight to parts to volume is the same as that of grams to milliliters.

EXAMPLE 1

10 parts of 1-nitroanthraquinone-2-carboxylic acid and 10 parts of hydroxylamine hydrochloride are suspended at room temperature in 60 parts of ethanol and 100 parts of 4 N sodium hydroxide. The mixture is refluxed for 3 hours, then cooled to room temperature, diluted with water and acidified with hydrochloric acid. The mixture is filtered and the filter cake is washed neutral with water and dried, affording 7.5 parts of 1,4-diaminoanthraquinone-2-carboxylic acid. Recrystallisation from alcohol yields an analytically pure sample with a melting point of about 352° C.

EXAMPLE 2

10 parts of 1-nitroanthraquinone-2-carboxylic acid and 10 parts of hydroxylamine hydrochloride are suspended at room temperature in 60 parts of methanol and 100 parts of 4 N sodium hydroxide. The mixture is refluxed for 3 hours, then cooled to room temperature, diluted with water and acidified with hydrochloric acid. The mixture is filtered and the filter cake is washed neutral with water and dried, affording 7.6 parts of 1,4-diaminoanthraquinone-2-carboxylic acid.

EXAMPLE 3

10 parts of 1-nitro-2-carbamoylanthraquinone and 10 parts of hydroxylamine hydrochloride are suspended at room temperature in 60 parts of ethanol and 100 parts of 4 N sodium hydroxide. The mixture is refluxed for 3 hours, then cooled to room temperature, diluted with water and acidified with hydrochloric acid. The mixture is filtered and the filter cake is washed neutral with water and dried, affording 7 parts of 1,4-diaminoanthraquinone-2-carboxylic acid.

EXAMPLE 4

10 parts of 1-nitro-2-carbamoylanthraquinone and 10 parts of hydroxylamine hydrochloride are suspended at room temperature in 60 parts of methanol and 100 parts of 4 N sodium hydroxide. The mixture is refluxed for 3 hours, then cooled to room temperature, diluted with water and acidified with hydrochlorid acid. The mixture is filtered and the filter cake is washed neutral with water and dried, affording 7.1 parts of 1,4-diaminoanthraquinone-2-carboxylic acid.

EXAMPLE 5

10 parts of 1-nitro-2-N-ethylcarbamoylanthraquinone and 10 parts of hydroxylamine hydrochloride are suspended at room temperature in 60 parts of ethanol and 100 parts of 4 N sodium hydroxide. The mixture is refluxed for 3 hours, then cooled to room temperature, diluted with water and acidified with hydrochloric acid. The mixture is filtered and the filter cake is washed neutral with water and dried, affording 7 parts of 1,4-diaminoanthraquinone-2-carboxylic acid.

EXAMPLE 6

10 parts of 1-nitro-2-N-ethylcarbamoylanthraquinone and 10 parts of hydroxylamine hydrochloride are suspended at room temperature in 60 parts of methanol and 100 parts of 4 N sodium hydroxide. The mixture is refluxed for 3 hours, then cooled to room temperature, diluted with water and acidified with hydrochloric acid. The mixture is filtered and the filter cake is washed neutral with water and dried, affording 7 parts of 1,4-diaminoanthraquinone-2-carboxylic acid.

The same end product is obtained in equally good yield by using 100 parts of 4 N potassium hydroxide in each of the foregoing Examples instead of 100 parts of 4 N sodium hydroxide.

EXAMPLE 7

10 parts of 1-nitroanthraquinone-2-carboxylic acid and 2 parts of hydroxylammonium sulfate are suspended at room temperature in 60 parts of isopropanol and 100 parts of 4 N sodium hydroxide. The mixture is refluxed for 3 hours, then cooled to room temperature, diluted with water and acidified with hydrochloric acid. The mixture is filtered and the filter cake is washed netural with water and dried, affording 7 parts of 1,4-diaminoanthraquinone-2-carboxylic acid.

The same end product is obtained in equally good yield by using, instead of 1-nitroanthraquinone-2-carboxylic acid, the same amount of methyl, ethyl, butyl or phenyl 1-nitroanthraquinone-2-carboxylate. Likewise, the same end product is obtained in equally good yield by using the same amount of propanol instead of isopropanol.

The identity of the products obtained in Examples 1 to 7 was confirmed by comparison with commercially obtainable analytically pure 1,4-diaminoanthraquinone-2-carboxylic acid. This comparison was made by means of thin-layer chromatography using different solvents. In addition, samples of end products obtained in several Examples were recrystallised from ethanol and subjected to elemental analysis. The results of the analysis gave the empirical formula of 1,4-diaminoanthraquinone-2-carboxylic acid and thus confirmed the data obtained by thin-layer chromatography.

What is claimed is:

1. A process for the manufacture of 1,4-diaminoanthraquinone-2-carboxylic acid, which comprises reacting 1-nitroanthraquinone-2-carboxylic acid or derivatives thereof with hydroxylamine or derivatives thereof, in alcohol/water mixtures at basic value pH values.

2. A process according to claim 1, which comprises the use of hydroxylamine hydrochloride.

3. A process according to either of claims 1 or 2, wherein the pH value is adjusted by addition of an alkali metal hydroxide.

4. A process according to claim 1, wherein the reaction is carried out in mixtures of methanol and water or ethanol and water.

5. A process according to claim 1, wherein 1-nitroanthraquinone-2-carboxylic acid is used as starting material.

6. A process according to claim 1, wherein 1-nitro-2-carbamoylanthraquinone is used as starting material.

7. A process according to claim 1, wherein 1-nitro-2-N-ethylcarbamoylanthraquinone is used as starting material.

* * * * *